(12) United States Patent
Fukumori et al.

(10) Patent No.: US 8,871,290 B2
(45) Date of Patent: Oct. 28, 2014

(54) METHOD FOR PRODUCING ALPHARIZED RICE AND ALPHARIZED RICE PRODUCED BY THE METHOD

(75) Inventors: Takeshi Fukumori, Tokyo (JP); Keishi Wakabayashi, Tokyo (JP)

(73) Assignee: Satake Corporation, Tokyo (JP)

( * ) Notice: Subject to any disclaimer, the term of this patent is extended or adjusted under 35 U.S.C. 154(b) by 68 days.

(21) Appl. No.: 13/352,890

(22) Filed: Jan. 18, 2012

(65) Prior Publication Data

US 2012/0201946 A1 Aug. 9, 2012

(30) Foreign Application Priority Data

Feb. 3, 2011 (JP) ................... 2011-022118

(51) Int. Cl.
  *A23L 1/01* (2006.01)
  *A23L 1/182* (2006.01)
  *A23B 9/08* (2006.01)
(52) U.S. Cl.
  CPC ............... *A23L 1/0121* (2013.01); *A23L 1/182* (2013.01); *A23B 9/08* (2013.01)
  USPC ............ 426/618; 426/511; 426/506; 426/520
(58) Field of Classification Search
  CPC ......... A23L 1/0121; A23L 1/182; A23B 9/08
  USPC .................. 426/618, 511, 520, 506
  See application file for complete search history.

(56) References Cited

U.S. PATENT DOCUMENTS

| | | | |
|---|---|---|---|
| 5,860,356 A * | 1/1999 | Kageyama | 99/330 |
| 2004/0126476 A1 | 7/2004 | Kanemoto et al. | |
| 2008/0220145 A1* | 9/2008 | Fukumori et al. | 426/627 |
| 2010/0323087 A1* | 12/2010 | Fukumori et al. | 426/618 |

FOREIGN PATENT DOCUMENTS

| | | |
|---|---|---|
| CN | 1522594 | 8/2004 |
| CN | 102423076 | 4/2012 |
| JP | 59-21362 | 2/1984 |
| JP | 3-130044 | 6/1991 |
| JP | 6070707 | 3/1994 |
| JP | 10-146160 | 6/1998 |
| JP | 10-151071 | 6/1998 |

(Continued)

OTHER PUBLICATIONS

Spanish Search Report mailed Mar. 23, 2012 in Spanish Patent Application 201230100.

(Continued)

*Primary Examiner* — Helen F Heggestad
(74) *Attorney, Agent, or Firm* — Staas & Halsey LLP

(57) ABSTRACT

To provide a method for producing alpharized rice in which a soaking process does not need to be provided and a shape of rice grains is maintained.

Means of Solution

Such technical measure is taken that pressurized steam-boiling step in which raw material rice grains are steam-boiled with pressurized steam, a cooking step in which the rice grains after the pressurized steam-boiling step is alpharized, a high temperature drying step in which the rice grains after the alpharizing step are dried at high temperature, and a low temperature drying step in which the drying is performed at temperature lower than the high temperature drying step are sequentially provided without providing a soaking step, and an alpharized layer is formed on a surface of the rice grains by pressurized steam-boiling before the cooking step.

5 Claims, 6 Drawing Sheets

(56) References Cited

FOREIGN PATENT DOCUMENTS

| | | |
|---|---|---|
| JP | 2890044 | 2/1999 |
| JP | 2001-120199 | 5/2001 |
| JP | 2008-245599 | 10/2008 |

OTHER PUBLICATIONS

Chinese First Office Action issued Jul. 8, 2014 in Chinese Patent Application No. 201200238720.

Zhu Yibo, et al., "Preliminary Study on Change Rule of Physical Properties of Rice in High-temperature Instantaneous Alpharized Process" Science and Technology of Food Industry No. 2, Dec. 31, 2007, pp. 106-108.

Zhu Yibo, et al., "Study on Fermentation Technology of Making Sake based on High Temperature Instantaneous Alpharized Rice" Science and Technology of Food Industry No. 30, Dec. 31, 2009, pp. 209-213.

* cited by examiner

METHOD FOR PRODUCING ALPHARIZED RICE AND ALPHARIZED RICE PRODUCED BY THE METHOD

BACKGROUND OF THE INVENTION

1. Field of the Invention

The present invention relates to a method for producing alpharized rice which becomes eatable only by adding hot water without cooking and alpharized rice which is produced by the producing method.

2. Description of Related Art

Conventionally, alpharized rice which can be returned to the cooked rice state within a short period of time by adding water or hot water is known. The alpharized rice is produced such that white rice which is a raw material is soaked in water so as to make the white rice sufficiently absorb water, then the white rice is cooked to be alpharized, and the alpharized cooked rice is dried, as disclosed in Japanese Unexamined Patent Application Publication No. 3-130044, for example.

However, in the above-described producing method, it has been necessary to provide a soaking process as preceding treatment in which rice grains which are raw materials are sufficiently soaked in water and a moisture content of the rice grains is adjusted. Accordingly, large quantity of soaking water for performing the soaking process is required and in addition, an effluent treatment facility for treating the soaking water after the soaking needs to be provided, increasing not only running cost (operating cost) but also initial cost (facility cost).

In addition, if white rice is soaked in water to make the white rice absorb water, cracks occur on a surface of the white rice and tasty components and starch elute from the cracks. Further, there has been such problem that rice grains split in the drying performed after the alpharization due to the cracks and an outer appearance of alpharized rice and grainy texture as rice are degraded.

In view of the problems described above, a technical object of the present invention is to provide a method for producing alpharized rice in which a soaking step which needs large quantity of water is not provided and rice grains are hard to split in a drying process.

SUMMARY OF THE INVENTION

In order to solve the above-described problems, the present invention takes a technical measure sequentially including a pressurized steam-boiling step in which raw material rice grains are steam-boiled with pressurized steam so as to alpharize a surface of the rice grains, a cooking step in which a whole of the rice grains after the pressurized steam-boiling step is alpharized, a high temperature drying step in which the rice grains after the cooking step are dried at high temperature, and a low temperature drying step in which the drying is performed at temperature lower than the high temperature drying step. As described above, cooking treatment is performed after an alpharized layer is formed on the surface of the raw material rice grains by performing pressurized steam-boiling treatment. Therefore, the surface of the raw material rice grains becomes stiff with the alpharized layer. Accordingly, an occurrence of cracks of the rice grains can be prevented in the subsequent process of the cooking treatment and the pressurized steam-boiling step.

In the technical measure, the pressurized steam-boiling step is performed in a pressurized state in which pressure higher than atmospheric pressure by 0.05 MPa to 0.3 MPa is applied for 60 seconds to 180 seconds.

Further, in the high temperature drying step, the rice grains are dried by hot air of 110 degrees Celsius to 250 degrees Celsius so that a moisture content becomes in a range of 20% to 25%.

Furthermore, in the technical measure, the drying step is performed by two steps that are the high temperature drying step in which drying is performed at high temperature and the low temperature drying step in which drying is performed at low temperature.

According to the method for producing alpharized rice of the present invention, the cooking is performed in such state that an alpharized layer is formed on the surface of the raw material rice grains by performing the pressurized steam-boiling treatment with respect to the raw material rice grains. Therefore, water is more quickly absorbed in the cooking, so that a soaking process which has been conventionally required is not required. Accordingly, large quantity of water for soaking is not required and an effluent treatment facility for treating water used for the soaking is not required, being able to reduce running cost and initial cost.

Further, the cooking (alpharizing process) is performed in a state that an alpharized layer is formed on the surface of the raw material rice grains and stiffness is provided to the rice grains by the alpharized layer, so that cracks do not occur when the rice grains absorb water in the cooking. Further, the alpharized layer on the surface of the raw material rice grains is formed not by steam-boiling at normal pressure but by pressurized steam-boiling. Accordingly, uniform alpharization can be performed, without causing cracks of the whole surface of the rice grains, by pressurized steam-boiling in which pressure is applied to the surface of the rice grains from all circumferential directions. Consequently, alpharized rice which undergoes the process and is completed is a product which has an excellent outer appearance.

Furthermore, cracks do not occur due to the effect of the alpharized layer even though rapid water absorption (high speed water addition) is performed. Therefore, slow water addition or water absorption does not have to be performed, so that time of water adding treatment can be shortened and thus time of producing the alpharized rice can be shortened.

DETAILED DESCRIPTION

Figure 1:
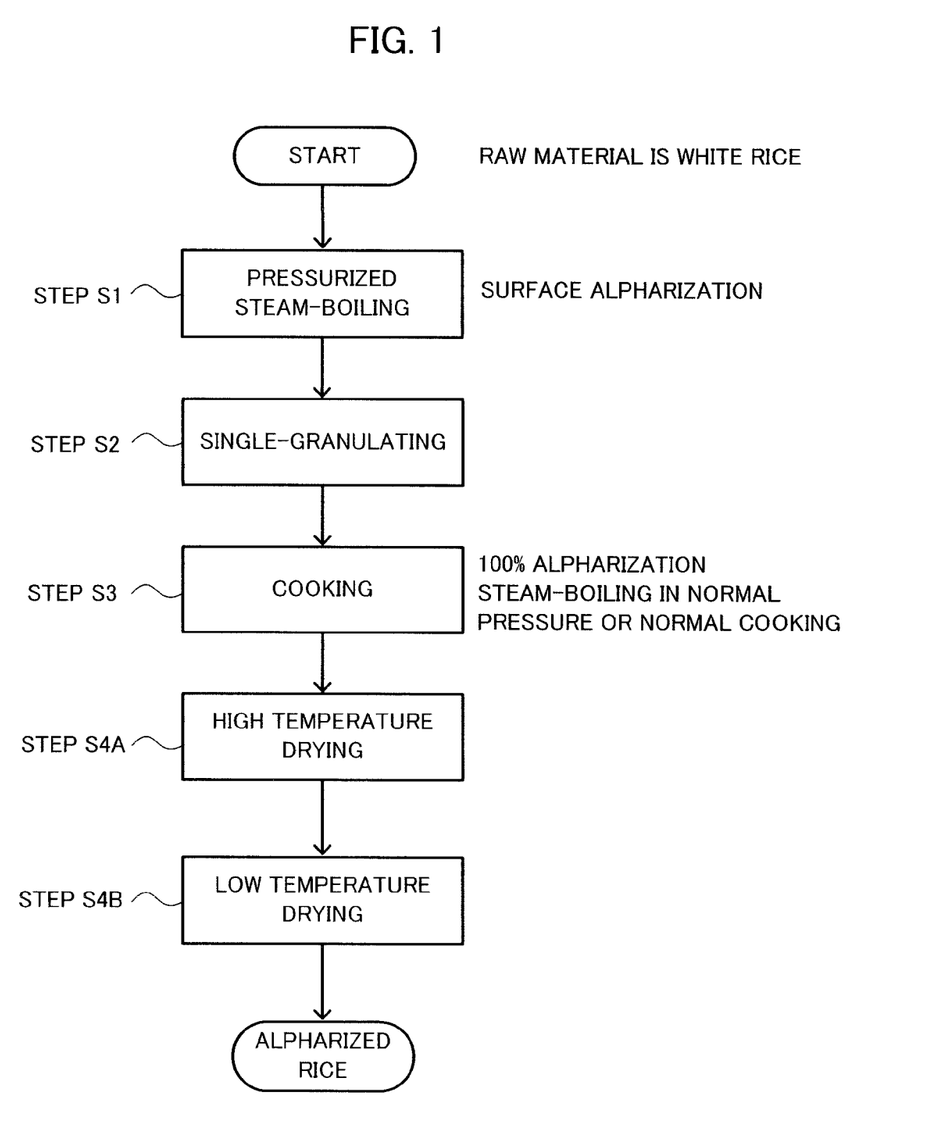
FIG. 1 illustrates a producing flowchart in a method for producing alpharized rice according to the present invention.

An embodiment of the present invention is described with reference to a flowchart of alpharized rice production shown in FIG. 1.

In this embodiment, a raw material is white rice and may be short-grain type, middle-grain type, or long-grain type, and the breed is not limited. It is preferable to set moisture less than 14% so as to make central parts of rice grains porous in a pressurized steam-boiling process.

Figure 2:
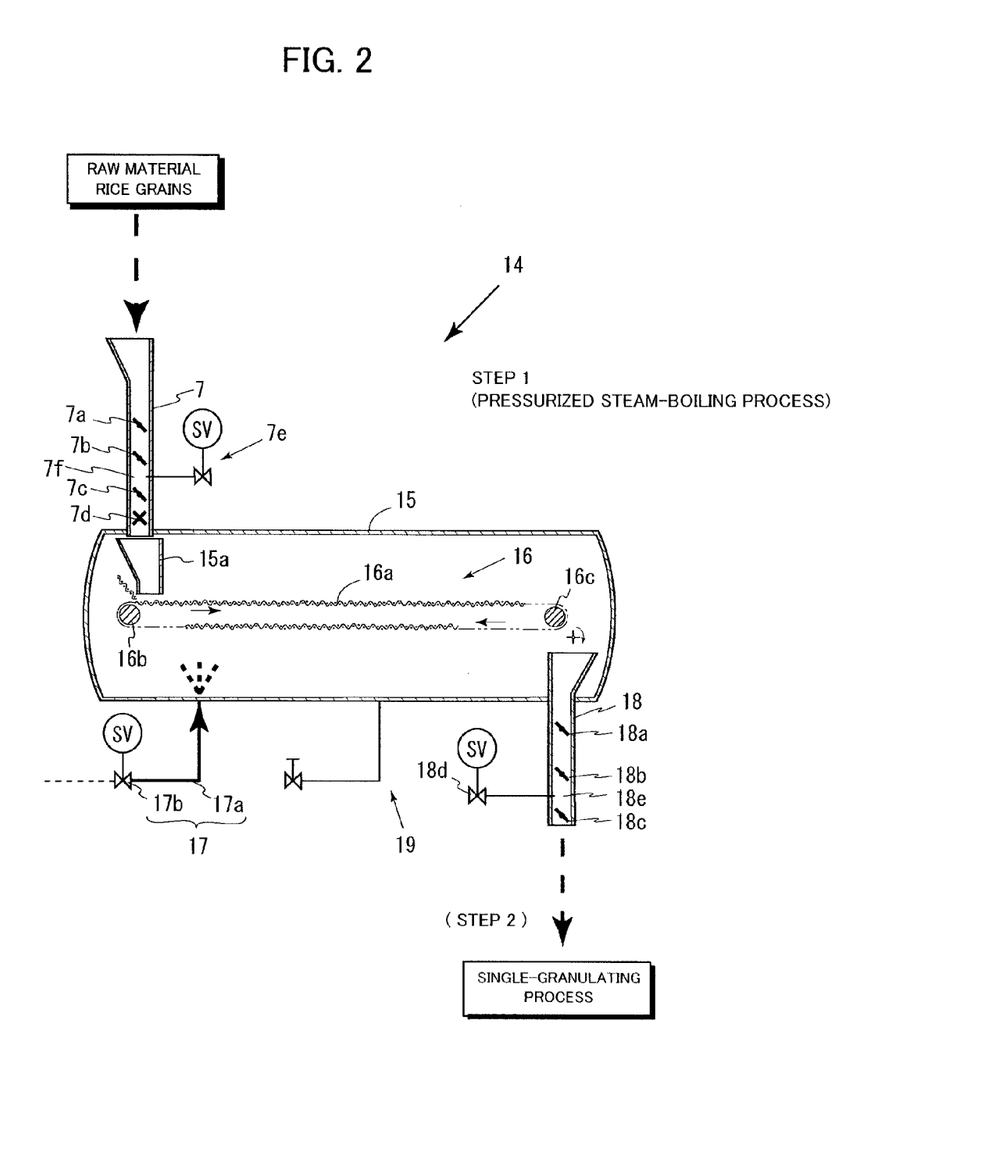
FIG. 2 is a longitudinal sectional view of a pressurized steam-boiling apparatus according to the present invention.

Step 1 (Pressurized Steam-Boiling Process):

In this pressurized steam-boiling process, raw material white rice is steam-boiled in a pressurized state so as to alpharize a surface of the rice grains for the subsequent process. FIG. 2 illustrates a pressurized steam-boiling apparatus 14 which is used in the pressurized steam-boiling process. The pressurized steam-boiling apparatus 14 has a machine wall 15 enclosing the inside thereof in which a belt conveyor 16 is disposed in a horizontal orientation. The belt conveyor 16 is composed of a net-type conveyor endless belt 16a, and a driving roller 16b and a driven roller 16c between which the conveyor endless belt 16a runs. At the bottom of the machine wall 15, a pressurized and heated steam supply section 17 which supplies pressurized and heated steam into an enclosed space formed by the machine wall 15 is disposed. The pressurized and heated steam supply section 17 includes a pressurized and heated steam supply source (not shown) and a steam pipe 17a which supplies pressurized and heated steam generated by the pressurized and heated steam supply source to a supply port (not shown) provided at the bottom of the machine wall 15. At some midpoint of the steam pipe 17a, an on-off valve 17b is disposed.

On a conveyor start end side of the belt conveyor 16, a tilted shoot pipe 15a for supplying the rice grains (raw material) onto the belt conveyor 16 is disposed. Further, an upstream side end of the tilted shoot pipe 15a communicates with the discharge side of a charging pipe 7 to receive the rice grains into this step 1 (the pressurized steam-boiling process).

Inside the charging pipe 7, a plurality of valves are incorporated so as to prevent pressurized and heated steam in the machine wall 15 from exiting outside. The plurality of valves are such that a shock absorbing damper 7a that absorbs shock of the falling raw material, an upper butterfly valve 7b, a lower butterfly valve 7c, and a loosening plate 7d that loosens a lump of the supplied raw material are disposed inside the charging pipe 7 sequentially from top so as to be spaced in an arbitrary distance apart from each other. In a gap 7f between the upper butterfly valve 7b and the lower butterfly valve 7c in the charging pipe 7, an air releasing valve 7e is provided.

The operation of the plurality of valves in the charging pipe 7 is described. When the raw material is supplied via the charging pipe 7 to the pressurized steam-boiling apparatus 14, the upper butterfly valve 7b and the lower butterfly valve 7c are first both set to be in a closed state to release pressure (pressurized and heated steam) in the gap 7f from the air releasing valve 7e. Then, the upper butterfly valve 7b is set to be in an open state, and the raw material is supplied from an upper supply side into the gap 7f while the amount of flow is being adjusted based on the degree of opening of the shock absorbing damper 7a. Then, when a predetermined amount of raw material is accumulated in the gap 7f, the air releasing valve 7e is set to be in a closed state, and the upper butterfly valve 7b is set to be in a closed state. Subsequently, the lower butterfly valve 7c is set to be in an open state. Accordingly, the raw material falls under its own weight to be supplied via the loosening plate 7d to the pressurized steam-boiling apparatus 14 (inside the tilted shoot pipe 15a). With this sequence being repeated, one lot of the raw material is sequentially supplied into the pressurized steam-boiling apparatus 14.

On a conveyor termination end side of the belt conveyor 16, a downward transport pipe 18 for discharging the rice grains having rice grain surface layers which are alpharized in the pressurized steam-boiling apparatus 14 to outside of the machine wall 15 is disposed. Also inside the downward transport pipe 18, a plurality of valves are disposed, as with the charging pipe 7, so as to prevent pressurized and heated steam in the pressurized steam-boiling apparatus 14 from exiting outside to decrease the pressure in the machine wall 15 when the alpharized rice grains are discharged to the outside of the machine wall 15. The plurality of valves are such that a shock absorbing damper 18a that absorbs falling shock when the raw material processed in the pressurized steam-boiling apparatus 14 is discharged to fall, an upper butterfly valve 18b, and a lower butterfly valve 18c are disposed inside the downward transport pipe 18 sequentially from top to bottom so as to be spaced in an arbitrary distance apart from each other. In a gap 18e between the upper butterfly valve 18b and the lower butterfly valve 18c in the downward transport pipe 18, an air releasing valve 18d is provided. At the bottom of the machine wall 15, a drain section 19 for drainage of steam accumulated as water drops in the pressurized steam-boiling apparatus 14 is provided.

The operation of the plurality of valves in the downward transport pipe 18 is described. When the alpharized rice grains are discharged via the downward transport pipe 18 from the pressurized steam-boiling apparatus 14, the upper butterfly valve 18b and the lower butterfly valve 18c are first both set to be in a closed state to release pressure (pressurized and heated steam) in the gap 18e from the air releasing valve 18d. Then, the upper butterfly valve 18b is set to be in an open state, and the rice grains to be discharged are supplied into the gap 18e while the amount of flow is being adjusted by adjusting the degree of opening of the shock absorbing damper 18a. Then, when a predetermined amount of rice grains are accumulated in the gap 18e, the air releasing valve 18d is set to be in a closed state, the upper butterfly valve 18b is set to be in a closed state, and then the lower butterfly valve 18c is set to be in an open state. Accordingly, the rice grains fall under their own weight to be discharged outside. With this sequence being repeated, one lot of processed brown rice is sequentially discharged outside the pressurized steam-boiling apparatus 14.

The operation of step 1 (pressurized steam-boiling process) is described.

First, saturated steam pressurized is supplied from the pressurized and heated steam supply section 17 into the machine wall 15 of the pressurized steam-boiling apparatus 14, and the pressure in the machine wall 15 is adjusted to have an arbitrary-set value which is larger than atmospheric pressure within a range of 0.05 MPa to 0.3 MPa. The temperature in the machine wall 15 when the pressure in the machine wall 15 is larger than atmospheric pressure within a range of 0.05 MPa to 0.3 MPa as described above is approximately 110 degrees Celsius to 145 degrees Celsius. Next, the rice grains which are the raw material are supplied to the conveyor start end side of the belt conveyor 16. The time for pressurized steam-boiling of the supplied rice grains is preferably within a range of 60 seconds to 180 seconds, and the conveyance speed of the belt conveyor 16 is adjusted so that the time has an arbitrary-set value within the time range mentioned above. Under such conditions, the rice grains are subjected to pressurized steam-boiling treatment under a pressurized state in which the pressure is larger than atmospheric pressure by the range of 0.05 MPa to 0.3 MPa (temperature: approximately 110 degrees Celsius to 145 degrees Celsius) for 60 seconds to 180 seconds. With this, the surface layers (0.1 mm to 0.5 mm) are alpharized (approximately 10% to 20%), and the central parts of the rice grains become porous (in the pressurized steam-boiling process, the central parts of the rice grains are heated to be puffed and cells are separated from each other to form gaps, generating a porous state like a sponge) and thereby the water absorption ability is enhanced. Subsequently, the rice grains are discharged from the downward transport pipe 18. The degree of alpharization of the rice grain surface layer varies depending on the pressurized state and the set value within the range of pressurized steam-boiling time. Within the range, when the pressure is high and the processing time is long, the degree of alpharization is large (more). Conversely, when the pressure is low and the processing time is short, the degree of alpharization is small (less). Here, since steam is used in the pressurized steam-boiling process, the quantity of water used is small, and the quantity of drainage from the drain section 19 is also small.

In this manner, pressurized steam-boiling of the rice grains has such advantage that each grain of rice can be uniformly subjected to pressurized steam-boiling from all circumferential directions with saturated steam smoothly filling the clearance between the grains by the pressure even when the grains of the rice grains are in contact with each other, thereby making the state of alpharization of the surface layer of each rice grain uniform and decreasing unevenness. This prevents water-addition (hydrous) ununiformity among the grains of white rice and in a single grain of white rice, in a subsequent cooking process (step 3), being effective for producing alpharized rice with higher quality.

Figure 3:
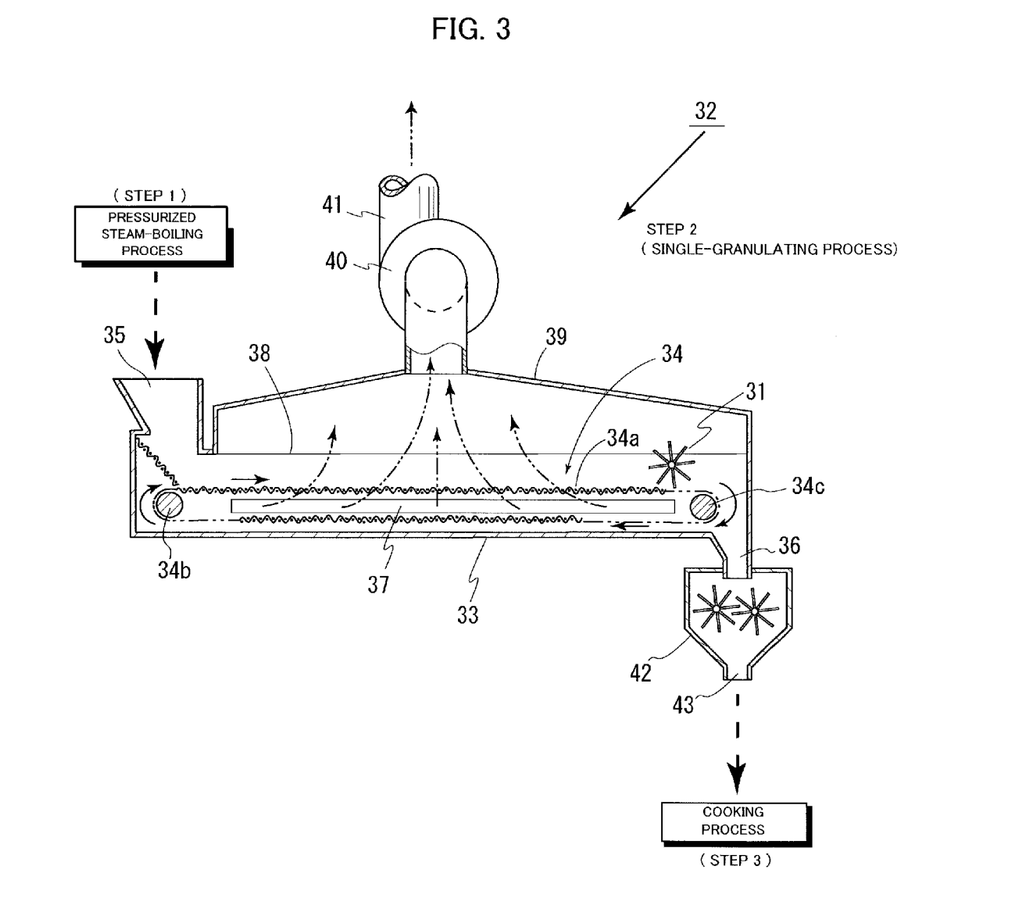
FIG. 3 is a longitudinal sectional view of a single-granulating apparatus according to the present invention.

Step 2 (Single-Granulating Process):

In this process, water attached to the surface of the white rice which has the alpharized surface layer and is discharged in the pressurized steam-boiling process (from the pressurized steam-boiling apparatus 14) which is the preceding process is removed and binding of the rice grains is weakened to single-granulate the rice grains. Simultaneously, the white rice loses heat from the surface thereof and the temperature of the surface of the white rice decreases to a temperature suitable for the subsequent process. FIG. 3 illustrates a single-granulating apparatus 32 which is used in the single-granulating process.

The single-granulating apparatus 32 has a machine wall 33 surrounding the inside thereof in which a belt conveyor 34 is disposed in a horizontal orientation. On one end upper part of the machine wall 33, a supply section 35 for supplying the rice grains (surfaces are alpharized) discharged in the preceding process onto the belt conveyor 34 is disposed. On the other end lower part of the machine wall 33, a discharging section 36 which discharges the rice grains which are roughly loosened is disposed from a conveyor termination part on the belt conveyor 34 and a disintegrator 42 is disposed beneath the discharging section 36.

The belt conveyor 34 is composed of a net-type conveyor endless belt 34a, and a driving roller 34b and a driven roller 34c between which the conveyor endless belt 34a runs. Further, on the conveyor termination part of the belt conveyor 34, a loosening means 31 for roughly loosening the rice grains of which heat is roughly removed and bonding force (force by which rice grains bond to each other) is weakened is disposed. As the loosening means 31, a known means such as the one disclosed in Japanese Unexamined Patent Application Publication No. 10-151071, for example, can be used. The disintegrator 42 is provided so as to single-granulate the rice grains (separate to each rice grain) which are roughly loosened by the loosening means 31.

On a part, which is on the lateral surface of the single-granulating apparatus 32, of the machine wall 33, an outside air inlet 37 which has a horizontally-long shape is formed along a longitudinal direction of the belt conveyor 34. On a part, which is on the upper surface of the single-granulating apparatus 32, of the machine wall 33, an air sucking and discharging port 38 having a size approximately equal to an area of the whole conveyance surface of the belt conveyor 34 is provided. The air sucking and discharging port 38 is connected to an exhaust tube 41 via a suction tube 39 and an air discharging fan 40.

The operation of step 2 (single-granulating process) is described.

In this step 2, the rice grains which are subjected to the steam-boiling treatment (surface alpharizing treatment) in the preceding process are sequentially supplied from the supply section 35 to the conveyor start end side of the conveyor endless belt 34a. The rice grains supplied onto the conveyor endless belt 34a are exposed to a draft of outside air by suction action of the air discharging fan 40 while being conveyed by the belt conveyor 34 and are loosened by the loosening means 31 in a state that heat of the surface of the rice grains is (roughly) removed and the surface temperature is decreased. Then, the rice grains are sequentially discharged from the discharging section 36 and are single-granulated by the disintegrator 42 which is connected to the lower end of the discharging section 36. The moisture content of the rice grains which are single-granulated and discharged from a discharging port 43 is within a range of approximately 15% to 30%. The draft occurs such that outside air which is took in from the outside air inlet 37 by the suction action of the air discharging fan 40 passes through the conveyor endless belt 34a which is positioned above.

Here, step 2 can be skipped in a case where the rice grains are sufficiently agitated by cooking water in a pot in charging the rice grains into the pot, for example. The pot is an individual container for cooking white rice in a small amount batch system.

Figure 4:
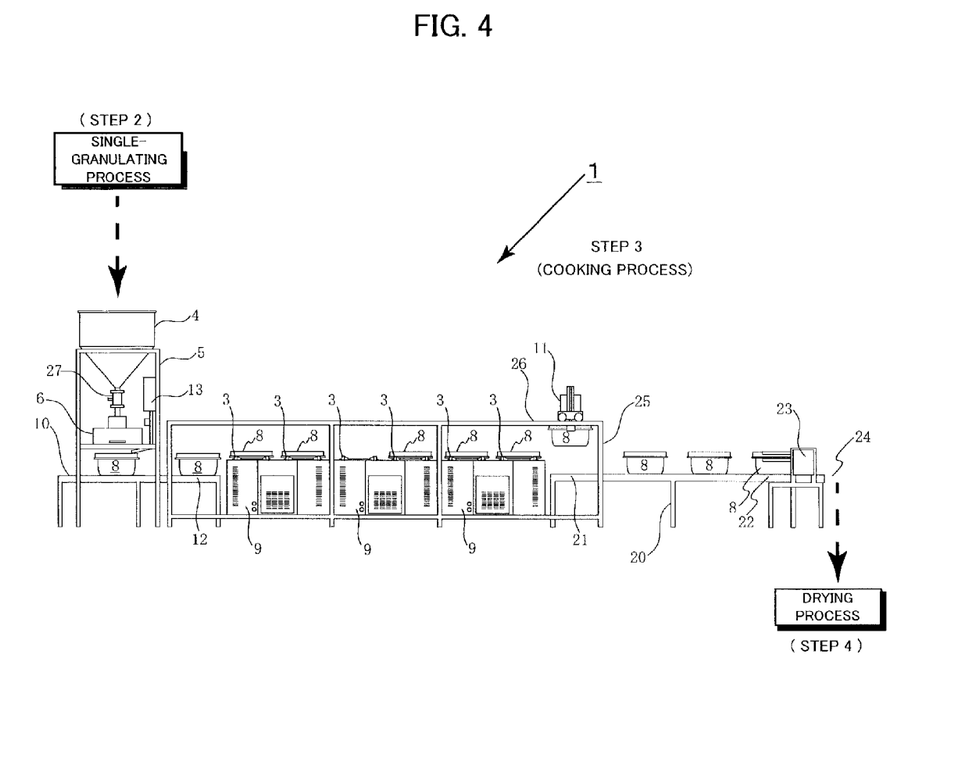
FIG. 4 is a schematic view of cooking equipment according to the present invention.

Step 3 (Cooking Process):

In this process, the rice grains discharged from the discharging port 43 of the disintegrator 42 of the single-granulating apparatus 32 are cooked so as to completely alpharize the rice grains. FIG. 4 is a side view schematically illustrating the whole of electromagnetic induction heating type cooking equipment 1. The electromagnetic induction heating type cooking equipment 1 is pot type cooking equipment. Here, the purpose of this process is to completely alpharize rice grains, so that a heat source of the cooking equipment is not limited to electromagnetic induction heating but may be other heat source such as steam and gas. Further, known cooking equipment may be used as the cooking equipment.

The rice grains which are single-granulated in the preceding process are conveyed to a charging hopper 4. The charging hopper 4 is disposed above a frame 5. A lower end of the charging hopper 4 is connected with a rice distributing apparatus 6 via a valve 27 and the rice grains in the charging hopper 4 are sequentially transferred to the rice distributing apparatus 6. The rice distributing apparatus 6 calculates an amount of rice which is to be charged to a pot 8 and distributes adequate amount of rice to the pot 8 carried beneath the rice distributing apparatus 6.

The pot 8 is loaded from a conveyor port 10 which is one end of a roller conveyor 28 which is disposed beneath the rice distributing apparatus 6 and conveyed beneath the rice distributing apparatus 6. Adequate amount of water is added to the pot 8 by a water adding apparatus 13 after the rice distribution, a lid is placed on the pot 8 after the water addition, and the pot 8 is conveyed to a pot receiving section 12 on the roller conveyor 28. The pot 8 conveyed to this position is conveyed to a cooking section 3 of a cooking apparatus 9 by a transport machine 11.

The transport machine 11 may be a common transport apparatus. The transport machine 11 used in the electromagnetic induction heating type cooking equipment 1 of the present invention has the configuration that the transport machine 11 can move on the upper part of a frame 25 in a linear direction along a rail 26 which is disposed on the upper part of the frame 25. The transport machine 11 is controlled by a control apparatus which is not shown and carries the pot 8 which is conveyed to the pot receiving section 12 into one of a plurality of cooking sections 3.

Here, the cooking apparatus 9 is described. Three cooking apparatuses 9 are provided in the electromagnetic induction heating type cooking equipment 1 of the present embodiment. The respective cooking apparatuses 9 have the same configuration as each other and two cooking sections 3 are provided for one cooking apparatus. The cooking apparatus 9 is controlled by a control section which is not shown. Here, the number of disposed cooking apparatuses 9 can be increased or decreased depending on the scale of a producing facility, and it is not necessary to make configurations of disposed cooking apparatuses 9 uniform depending on a cooking condition.

In the cooking section 3 of the cooking apparatus 9 to which the pot 8 is conveyed, cooking is performed (step S3). After the completion of the cooking process, the pot 8 is carried out from the cooking section 3 by the transport machine 11 to a pot carrying-out section 21 which is one end of a roller conveyor 20.

The pots carried out to the pot carrying-out section 21 are sequentially conveyed to a direction to a reversing section 22 on the roller conveyor. The pot conveyed to the reversing section 22 is put in a reversing machine 23 to be reversed by the reversing machine 23, and thus cooked rice in the pot is taken out by a taking-out section 24.

The cooking process (step S3) is now described. The rice grains which are subjected to the single-granulating process are supplied to the charging hopper 4 of the electromagnetic induction heating type cooking equipment 1. The rice grains supplied to the charging hopper 4 pass through the valve 27 to be transferred to the rice distributing apparatus 6. Adequate amount of rice grains of the rice grains transferred to the rice distributing apparatus 6 are charged into the pot 8 from the rice distributing apparatus 6. To the pot 8 to which the rice grains are charged, adequate amount of cooking water is supplied from the water adding apparatus 13. Then, the pot 8 to which the cooking water is supplied is lidded and conveyed on the roller conveyor 28 to the pot receiving section 12. Here, the pot 8 may be lidded automatically or manually.

The pot 8 conveyed to the pot receiving section 12 is carried in one of the plurality of cooking sections 3 by the transport machine 11. After the carrying-in, the cooking is performed in the cooking section 3 to which the pot 8 is carried in. Here, the purpose of this cooking process is to completely alpharize the rice grains, and the cooked rice is not eaten immediately after the cooking like common cooking at home. Therefore, detailed heating control for palatability immediately after cooking can be omitted.

After the cooking completion in the cooking section 3, the pot 8 is carried out from the cooking section 3 by the transport machine 11 to be carried to the pot carrying-out section 21 on the roller conveyor 20. Then, the pot 8 is conveyed to the reversing section 22 on the roller conveyor 20 to be reversed by the reversing machine 23 which is disposed on the reversing section 22, and the rice grains in the pot 8 (cooked rice which is completely alpharized) are taken out. The rice grains which are taken out are transferred to a drying process which is the subsequent process.

Here, when the rice grains of which the whole bodies are alpharized in the above-mentioned cooking process are conveyed to the drying process which is the subsequent process, the rice grains can be conveyed by an existing conveyor or the like. However, it is preferable to convey the rice grains by water transportation (a transporting method in which cooked rice is immersed in water to be mutually separated, and the cooked rice is conveyed while being scooped by a netting belt or the like so that the cooked rice grains form a planar layer) disclosed in Japanese Patent No. 4000678, for example.

Step 4 (Drying Process):

In this drying process, drying treatment is performed with respect to the cooked rice (cooked rice grains which are alpharized) which is discharged from the preceding process and has the moisture content of 55% to 65%. In the drying treatment, it is necessary to dry the cooked rice until the moisture content of the rice grains becomes 10% or less so as to make a water activity value of the rice grains equal to or lower than 0.5.

e, the water activity value represents a rate of free water which is contained in food items and is used as a barometer of preservability of food items. For example, if the water activity value is low even when the moisture content is high, proliferation of microorganisms is difficult and thereby preservability of a food item is good.

When the above-mentioned drying is performed, it is sufficient to perform quick drying at high temperature (110 degrees Celsius to 200 degrees Celsius) up to the moisture content of 20%. However, when the moisture content becomes in a range of 20% to 25%, it is preferable to switch to low temperature drying (70 degrees Celsius to 100 degrees Celsius) in consideration of palatability of alpharized rice to be produced. Accordingly, in the present invention, the drying process (step 4) is separated into two processes of a high temperature drying process (step 4A) and a low temperature drying process (step 4B) to be performed.

Figure 5:
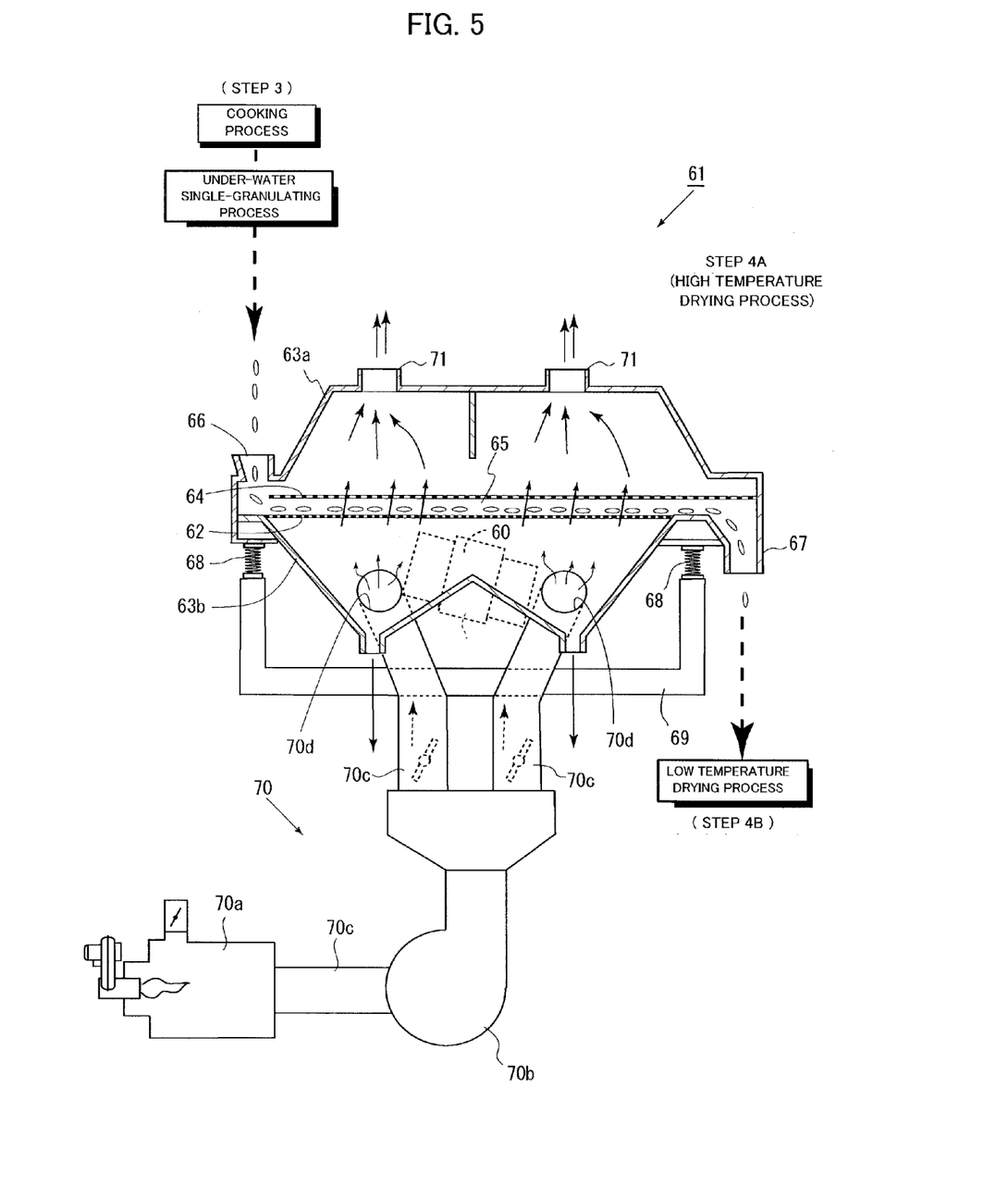
FIG. 5 is a longitudinal sectional view of a high temperature drying treatment apparatus according to the present invention.

In the high temperature drying process (step 4A), the rice grains discharged in the preceding process undergo the drying treatment at high temperature until the moisture content becomes within a range from 20% to 25%. FIG. 5 illustrates an example of a high temperature drying treatment apparatus 61 which performs the drying treatment. The high temperature drying treatment apparatus 61 includes a transport perforated plate 62. The transport perforated plate 62 includes many draft holes for transporting the rice grains while drying the rice grains, and is interposed between an upper machine frame 63a and a lower machine frame 63b so as to be disposed in a horizontal position. Above the transport perforated plate 62, a perforated plate 64 similar to the transport perforated plate 62 is disposed in an opposed manner, forming a rice grain transport path 65 with a height allowing the rice grains to be transported. On one end side of the rice grain transport path 65, a rice grain supply port 66 is disposed. On the other side thereof, a rice grain discharging port 67 is disposed. The transport perforated plate 62 (the rice grain transport path 65) can vibrate-transport the rice grains from a rice grain supply port 66 side to a rice grain discharging port 67 side with a vibrating operation of a vibration motor 60 disposed on the lower machine frame 63b. The lower machine frame 63b is held by a base 69 via a plurality of springs 68.

On the other hand, a hot-air generating and supplying apparatus 70 is disposed. The hot-air generating and supplying apparatus 70 has a burner section 70a configured of kerosene burner or the like, and an air-blow fan 70b. The air-blow fan 70b is configured so as to communicate with the lower machine frame 63b via a hot-air transport pipe 70c and a hot-air supply port 70d to supply hot air to a lower side of the transport perforated plate 62. The air-blow fan 70b and the burner section 70a communicate with each other via the hot-air transport pipe 70c. The hot-air transport pipe 70c may be provided with an air-quantity adjusting valve as appropriate. The upper machine frame 63a is provided with air discharging ports 71, allowing a discharge of a draft of hot air from the lower side of the transport perforated plate 62. To the air discharging port 71, a suction apparatus which is not shown may be connected. Here, the high temperature drying treatment apparatus 61 is described as an example in this step 4A. Alternatively, overheated steam, a microwave radiating and drying apparatus, or the like may be used other than the high temperature drying treatment apparatus 61 to achieve an object of drying rice grains at high temperature of approximately 110 degrees Celsius to 250 degrees Celsius.

The operation of the high temperature drying process is described. In the high temperature drying treatment apparatus 61, rice grains (alpharized cooked rice) with a moisture content of 55% to 65%, supplied from the rice grain supply port 66 to the transport perforated plate 62 (the rice grain transport path 65) and discharged at step 3 (cooking process), are subjected to an air draft operation of high temperature hot air from below, while being subjected to a vibrating operation of the vibration motor 60 and transported to a downstream direction, to be rapidly dried in a manner to keep cooking puffed shapes. The temperature of high temperature hot air is preferably approximately 110 degrees Celsius to 200 degrees Celsius, and more preferably, 120 degrees Celsius to 150 degrees Celsius. The time for draft of high temperature hot air is preferably 5 minutes to 15 minutes. Further, the moisture content of the rice grains is preferably approximately 20% to 25%.

In the high temperature drying process, the treatment (drying) to keep rice grain shapes puffed in the cooking is performed by a draft operation of high temperature hot air, but the occurrence of cracks on the surface of the rice grains to deform the shape of the rice grains is prevented. This is particularly because, in the processes so far, the pressurized steam-boiling process of step 1 is performed to alpharize the surface of the rice grains for stiffness, thereby allowing water addition without causing cracks. Furthermore, the rice grains with high stiffness on the surface thereof are supplied to the cooking process of step 3. Therefore, even when the rice grains are alpharized up to approximately 100%, alpharization treatment can be completed as the rice grains do not fall apart and the shape of the rice grains is maintained. Although the rapid drying is performed with the draft operation of high temperature hot air in the high temperature drying process of this step 4A, the rice grains have themselves been completely alpharized as described above, and the grains thus have high stiffness as a whole. Therefore, the drying treatment can be performed while maintaining the shape of the rice grains without deforming the shape of the rice grains puffed in the cooking.

Step 4B (Low Temperature Drying Process):

In the low temperature drying process, the rice grains discharged in the high temperature drying process which is the preceding process is finish-dried to have a moisture content equal to or lower than 10%. In the low temperature drying process, any known drying apparatus can be used. For example, a net drying apparatus 72 depicted in FIG. 6 can be used. The net drying apparatus 72 is obtained by improving the single-granulating apparatus 32 depicted in FIG. 3, capable of supplying hot air from below the net-type conveyor endless belt 34a. That is, a hot-air generating and supplying apparatus 73 is connected to a lower portion of the main body of the net drying apparatus 72. The hot-air generating and supplying apparatus 73 includes a burner section 73a, an air-blow fan 73b, and a hot-air transport pipe 73c. Via the hot-air transport pipe 73c, a draft of hot air is supplied from the lower side of the conveyor endless belt 34a. Here, portions identical to those in the single-granulating apparatus 32 are not described herein because the description is already given.

Figure 6:
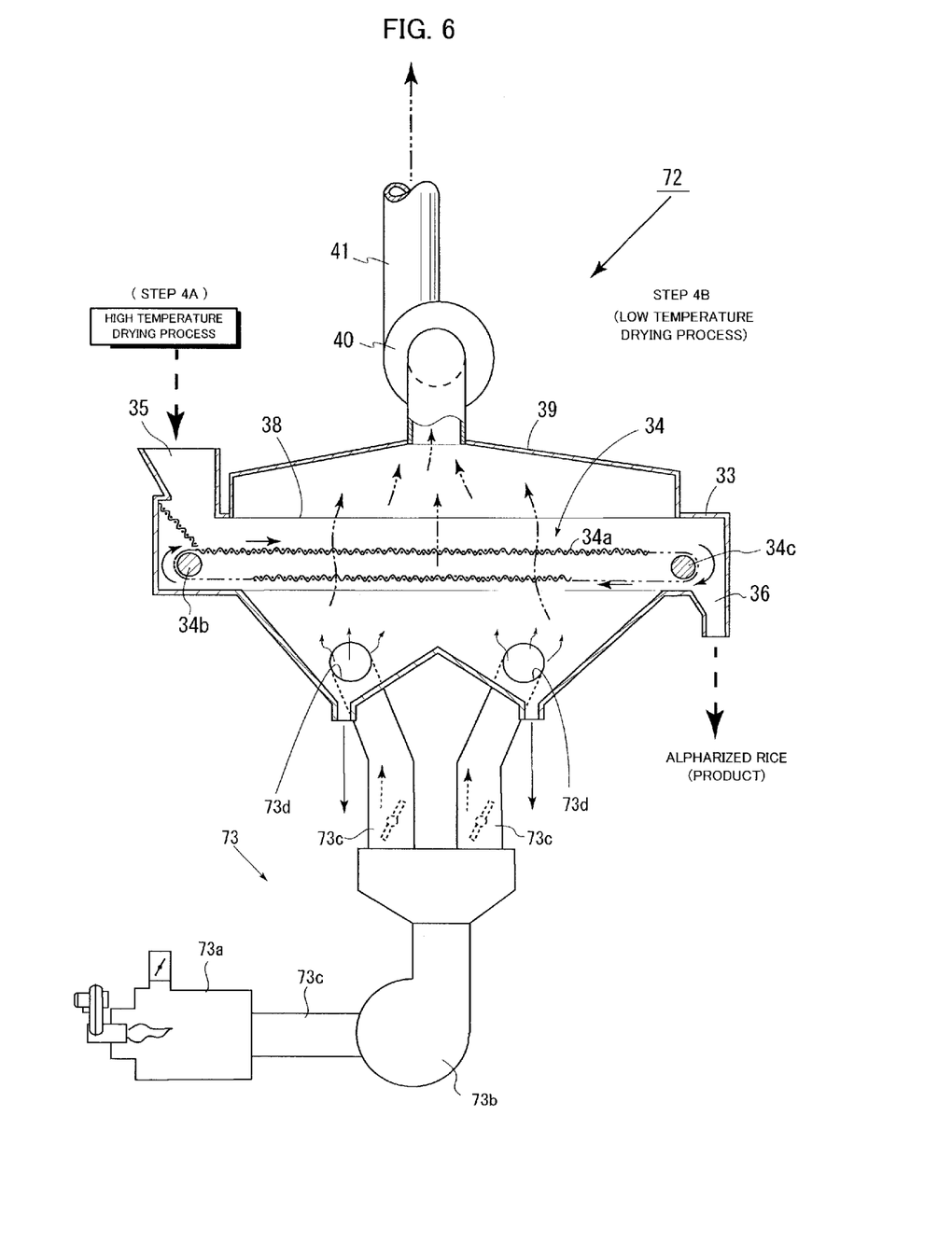
FIG. 6 is a longitudinal sectional view of a low temperature drying treatment apparatus according to the present invention.

The operation of the low temperature drying process is described. In the low temperature drying process, the rice grains which are subjected to the high temperature drying process in the preceding step 4A (moisture content: approximately 20% to 25%) are supplied from the supply section 35 to the conveyor start end side of the conveyor endless belt 34a by using the net drying apparatus 72. The rice grains supplied to the conveyor start end side receive a draft of hot air at 70 degrees Celsius to 100 degrees Celsius supplied from the hot-air generating and supplying apparatus 73 for low temperature drying while being conveyed by the conveyor endless belt 34a until the moisture content becomes equal to or lower than 10%, and are then discharged from the discharging section 36 in a state that the water activity value (AW) is 0.5 or less. Here, the hot-air draft time is preferably within 60 minutes to 90 minutes.

Though white rice is described as an example in the above-described embodiment, rice grains which are applicable in the invention may be brown rice, partially-milled rice, white rice, or sprouted rice as described above.

Further, as described in the above embodiment, the present invention is a method in which product alpharized rice can be efficiently produced from raw material rice grains in continuous treatment by continuously using respective apparatuses of step 1 to step 5.

The feature of the present invention is the technical measure that an alpharized layer is formed on the surface of the rice grains by pressurized steam-boiling before the cooking process without providing a soaking process, as described above.

The alpharized rice completed in the above-described embodiment does not need to be boiled when being eaten but the alpharized rice returns to cooked rice only by pouring hot water, as described above. Further, there is also an advantage that the rice grains can be cooked by boiling in shorter time than usual.

What is claimed is:

1. A method for producing steam-boiled white rice, sequentially consisting essentially of:
   a pressurized steam-boiling step in which raw material white rice grains are steam-boiled with pressurized steam so as to steam-boil a surface of the white rice grains;
   a cooking step in which a whole of the white rice grains after the pressurized steam-boiling step is steam-boiled; and
   a drying step in which the white rice grains after the cooking step are dried.

2. The method for producing steam-boiled white rice according to claim 1, wherein the pressurized steam-boiling step is performed in a pressurized state in which pressure higher than atmospheric pressure by 0.05 MPa to 0.3 MPa for 60 seconds to 180 seconds.

3. The method for producing steam-boiled white rice according to claim 1, wherein the drying step is performed by two steps that are a high temperature drying step in which drying is performed at temperatures from 110 degrees Celsius to 250 degrees Celsius and a low temperature drying step in which drying is performed at temperatures from 70 degrees Celsius to 100 degrees Celsius.

4. The method for producing steam-boiled white rice according to claim 3, wherein the rice grains are dried by hot air of 110 degrees Celsius to 250 degrees Celsius so that a moisture content becomes in a range of 20% to 25% in the high temperature drying step.

5. Steam-boiled white rice that is produced by the method for producing steam-boiled white rice according to any one of claims 1 to 4.

* * * * *